(12) United States Patent
Bertosa et al.

(10) Patent No.: US 8,996,237 B2
(45) Date of Patent: Mar. 31, 2015

(54) SMART POWER MANAGEMENT SYSTEM AND METHOD THEREOF

(71) Applicant: Service Solutions U.S. LLC, Warren, MI (US)

(72) Inventors: Thomas Bertosa, Chardon, OH (US); Michael Gessner, Akron, OH (US); Alfred L. Lancki, North Olmsted, OH (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 0 days.

(21) Appl. No.: 14/031,504

(22) Filed: Sep. 19, 2013

(65) Prior Publication Data

US 2014/0277915 A1    Sep. 18, 2014

Related U.S. Application Data

(60) Provisional application No. 61/787,958, filed on Mar. 15, 2013.

(51) Int. Cl.
| | |
|---|---|
| *G01M 17/00* | (2006.01) |
| *G21C 17/00* | (2006.01) |
| *G01M 17/007* | (2006.01) |
| *G07C 5/00* | (2006.01) |
| *G06Q 30/06* | (2012.01) |

(52) U.S. Cl.
CPC ............. *G01M 17/007* (2013.01); *G07C 5/008* (2013.01); *G06Q 30/0613* (2013.01); *G07C 5/00* (2013.01)
USPC ........................................................ 701/31.4

(58) Field of Classification Search
USPC .................... 701/29.1, 31.4–31.5, 33.2, 34.3; 702/182–184, 188; 340/539.3, 539.24; 365/226–229
See application file for complete search history.

(56) References Cited

U.S. PATENT DOCUMENTS

| | | | |
|---|---|---|---|
| 2003/0069673 | A1 | 4/2003 | Hong et al. |
| 2007/0294088 | A1 | 12/2007 | Thelen et al. |
| 2008/0104583 | A1 | 5/2008 | Wempen et al. |
| 2009/0112397 | A1 | 4/2009 | Roberts et al. |
| 2009/0161557 | A1* | 6/2009 | Macias .......................... 370/242 |
| 2009/0309745 | A1* | 12/2009 | Johnson ........................ 340/635 |
| 2010/0138696 | A1* | 6/2010 | Dehaan et al. .................. 714/37 |
| 2011/0112932 | A1 | 5/2011 | Chen |
| 2011/0237203 | A1* | 9/2011 | Battista ........................... 455/68 |
| 2012/0035800 | A1* | 2/2012 | Roberts ........................ 701/29.1 |
| 2012/0035804 | A1* | 2/2012 | Roberts ........................ 701/33.2 |

OTHER PUBLICATIONS

International Search Report mailed Aug. 4, 2014 for PCT/US2014/030334 filed Mar. 17, 2014.

* cited by examiner

*Primary Examiner* — Yonel Beaulieu
(74) *Attorney, Agent, or Firm* — Baker & Hostetler LLP

(57) ABSTRACT

A diagnostic tool that can communicate with a computing device such as smart phone is provided. The diagnostic tool can include a power management system that allows the dynastic tool to enter lower power state in order to prevent the power drain of vehicle battery. The diagnostic tool can also AutoID a vehicle or use a "fingerprinting" process to identify the vehicle. A crediting system is provided that can be used to credit a 3$^{rd}$ party for software purchased for use by the diagnostic tool or smart phone.

20 Claims, 9 Drawing Sheets

SMART POWER MANAGEMENT SYSTEM AND METHOD THEREOF

CROSS-REFERENCE TO RELATED APPLICATIONS

This application claims the benefit of Provisional Application Ser. No. 61/787,958; filed Mar. 15, 2013, entitled "Method and Apparatus for Revenue Sharing Based on Brand," the disclosure of which is hereby incorporated by reference in its entirety.

FIELD OF THE DISCLOSURE

The disclosure relates generally to a diagnostic tool and software. Particularly, a vehicle diagnostic tool that interacts with a computing device, such as a smart phone, and is able to share revenue with a third party and manage power.

BACKGROUND

Onboard control computers (electronic control units) have become prevalent in motor vehicles. Successive generations of onboard control computers have acquired increasing data sensing and retention capability as the electronics have advanced.

Vehicle diagnostic tools report the data acquired by the onboard control computers. Diagnostic tools can detect faults based on Diagnostic Trouble Codes or DTCs that are set in the vehicle's onboard control computers. A DTC can be triggered and stored when there is a problem with the vehicle. A technician then retrieves the DTCs using a diagnostic tool, repairs the associated problem and then deletes the DTCs from the vehicle's computer.

The diagnostic tools and the associated software are often too expensive. Additionally, vehicles that are covered by the software cannot be purchased on a vehicle by vehicle basis or functionality basis (e.g. code definition or ABS) but rather are available only through comprehensive all vehicles and functionality coverage, thereby, making the software too expensive for a technician in a small garage to purchase. Thus, a garage that specializes only in BMWs cannot simply purchase vehicle coverage for only BMWs but must purchase software that includes all vehicles coverage regardless of vehicle or manufacture or year.

Diagnostic tools include software that can be separately purchased, however, typically dealers do not get a share of revenues stemming from software purchases or updates. Thus, the dealers only receive revenue based on the sale of the diagnostic tool.

Therefore, there is a need for a diagnostic tool that can be used with existing computing devices owned by a technician such as a smart phone and software that can be purchased on a vehicle by vehicle or functionality basis. Additionally, there is a need to share revenues with dealers so that the dealers are encouraged to sell more diagnostic tools requiring the technician to purchase software or updates.

SUMMARY

The foregoing needs are met, to a great extent, by the present disclosure, wherein in one aspect an apparatus is provided that in some embodiments includes a diagnostic tool that communicates with another computing device such as a smart phone. The diagnostic tool and the smart phone can also include software that can control the diagnostic tool to power down the diagnostic tool before it drains a vehicle's battery.

Further, the disclosure includes the ability to share revenue stemming from the sale of software that can be used on the diagnostic tool and/or smart phone. The disclosure can also include the ability to AutoID a vehicle or collect various "fingerprint" markers from a vehicle in order to uniquely identify a vehicle that the diagnostic tool is attached to and previously scanned or diagnosed.

In one embodiment, a diagnostic tool includes a processor that controls a function of the diagnostic tool, a memory that stores software for diagnosing an issue of a vehicle and to operate the function of the diagnostic tool, a power manager configured to switch the diagnostic tool from a normal power state to a lower power state and vice versa, a vehicle connector interface configured to connect the diagnostic tool to a data link connector in the vehicle, and a wireless interface configured to communicate with a remote device, wherein when a command from the remote device is received by the wireless interface within a first predetermined period of time, the diagnostic tool will remain in the normal power state.

In another embodiment, a method of power management includes establishing a communication session between the diagnostic tool and a smart phone, receiving, at the diagnostic tool, a power status request from the smart phone, sending battery voltage information from the diagnostic tool to the smart phone in response to the request, starting a timer for a predetermined period of time if the battery voltage is below a predetermined amount, sending, from the diagnostic tool to the smart phone, a message that the connection between the diagnostic tool and the smart phone is terminating and a remaining amount of time remaining on the timer, and powering the diagnostic tool from a normal power state to a lower power state.

In still another embodiment, a vehicle diagnostic tool includes a processor that controls a plurality of functions of the vehicle diagnostic tool, a memory that stores vehicle diagnostic software and software to operate the plurality of functions of the vehicle diagnostic tool, an indicator configured to indicate a status of the vehicle diagnostic tool, a power management device configured to switch the vehicle diagnostic tool from a normal power state to a lower power state and vice versa, a vehicle connector interface configured to connect the vehicle diagnostic tool to a data link connector in the vehicle, a wireless interface configured to communicate with a smart phone, and a housing configured to house the processor, the memory, the indicator, the power management device, the vehicle connector interface, and the wireless interface, wherein when a command is not received from the smart phone by the wireless interface within a first predetermined period of time, the vehicle diagnostic tool will switch from the normal power state to the lower power state.

There has thus been outlined, rather broadly, certain embodiments of the disclosure in order that the detailed description thereof herein may be better understood, and in order that the present contribution to the art may be better appreciated. There are, of course, additional embodiments of the disclosure that will be described below and which will form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

Figure 1:
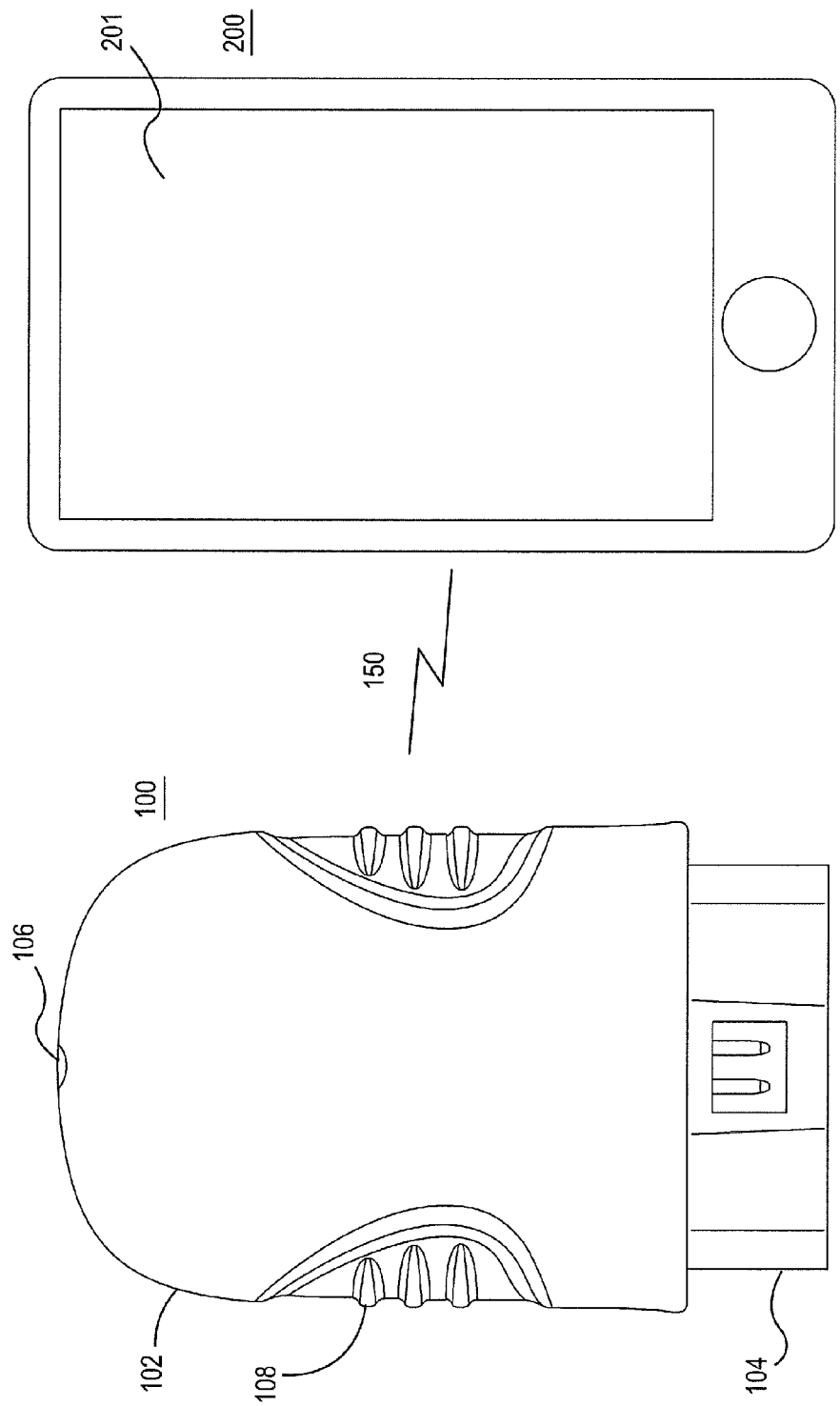
FIG. 1 illustrates a diagnostic tool and a smart phone according to an embodiment of the disclosure.

The disclosure will now be described with reference to the drawing figures, in which like reference numerals refer to like parts throughout. An embodiment in accordance with the present disclosure provides a diagnostic tool, such as a vehicle communication interface, that can retrieve and communicate vehicle data to a remote computing device, such as a smart phone.

FIG. 1 illustrates a diagnostic tool 100 and a smart phone 200 according to an embodiment of the disclosure. An example of the diagnostic tool 100 is the U-Scan™ from Service Solutions U.S. LLC (Warren, Mich.) in the form of a vehicle communication interface. The diagnostic tool 100 may include a housing 102, a connector 104, and indicator 106. The housing may be made of any material such as a polymer including thermoplastic. The housing 102 also includes gripping portions 108 made of a polymer including hydrogels for easy gripping by a user such as technician. The gripping portions 108 can be protrusions or ridges extending from the housing 102.

The connector 104 is configured to mate with a data link connector on a vehicle. The data link connector (DLC) is a communication port or bus for various electronic control units on a vehicle. The connector 104 can also mate with a cable (not shown) that in turn mates with the DLC. The connector 104 can be configured to mate with any communication port that provides vehicle data such as vehicle diagnostic data.

The housing also includes the indicator 106 on an outside surface of the housing 102. The indicator can be for example, LED, OLED, lights, and other types of indicators. The indicator 106 provides status information about the diagnostic tool 100 such as powered, transmitting, receiving, no connection, other malfunction, and the like. The indicator 106 can be on any surface of the housing 102 so long as it is visible to the technician.

The diagnostic tool 100 may alternatively have a display on the housing 102. The display can be any type of display including a touch screen display, LCD, LED, VGA, OLED, SVGA and other types of displays. The display may be a colored, non-colored (e.g. gray scale) or a combination of both. The display can display information such as the make, model, year of vehicles that the diagnostic tool can diagnose, the various diagnostic tests the diagnostic tool can run, diagnostic data the diagnostic tool has received, the baseline data of the various components in a vehicle, part images, parts information, and information from remote servers (internet, database information, etc.). Additionally, the display can show videos for the user to view and the accompanying audio can be heard via the built in speakers.

The diagnostic tool 100 can communicate with a smart phone 200 via a wireless 150 or wired (not shown) connection. By communicating wirelessly, the technician can be remote from the vehicle to which the diagnostic tool 100 is attached, thereby, the technician can potentially diagnose more than one vehicle a time. The smart phone 200 can be connected to more than one diagnostic tool 100.

The smart phone can be any type of smart phone such as ones from HTC™, Samsung™, BlackBerry™, and Apple™. The smart phone can also run various operate system including IOS, Android, Linux, BlackBerry 10, and Microsoft™ Windows 8 and the like. The smart phone 200 may include a display 201 that is a touch screen in order to receive various inputs from the technician and the display can also display any information to the technician.

In other embodiments, the diagnostic tool 100 can communicate with other remote computing devices such as a personal computer (PC), a UNIX workstation, a server, a mainframe computer, a personal digital assistant (PDA), a cellular phone, a tablet computer, a slate computer, another diagnostic tool, or some combination of these.

Figure 2:
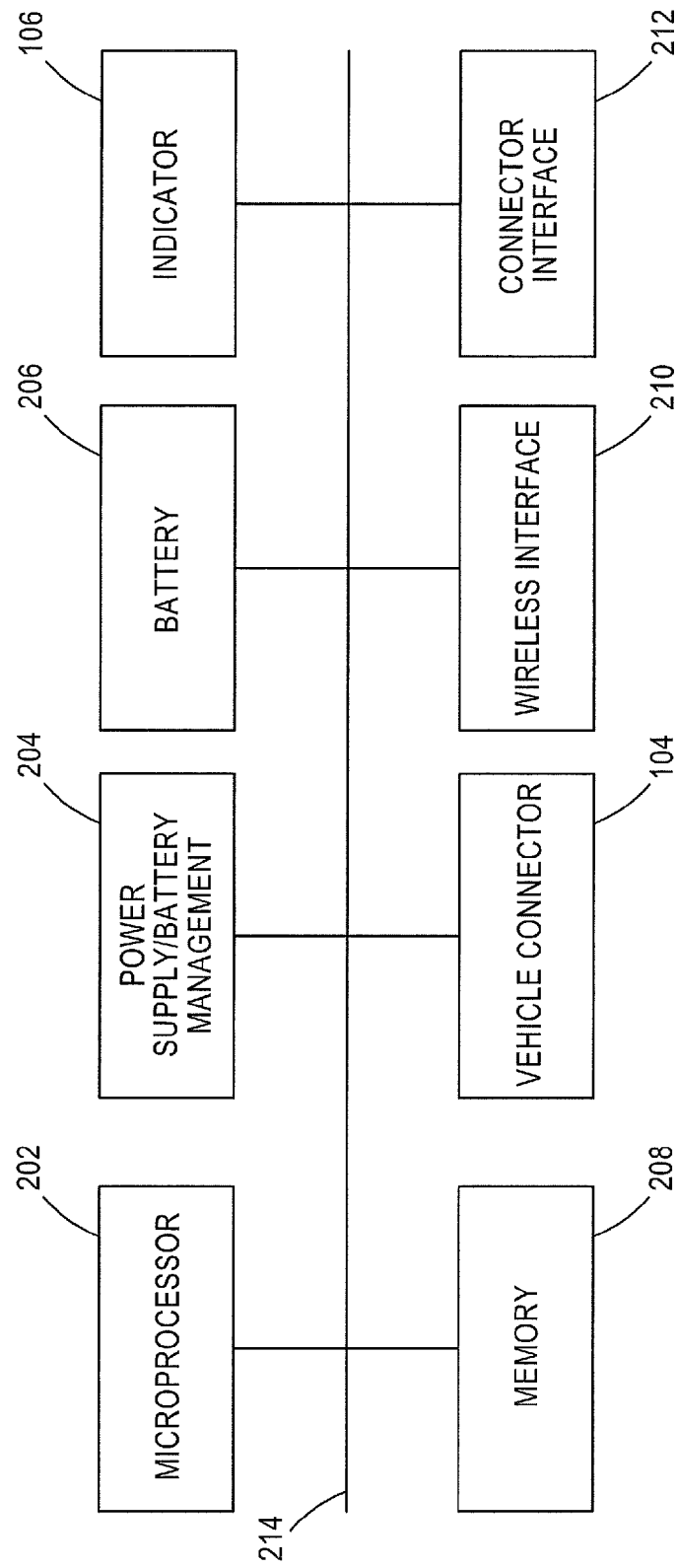
FIG. 2 illustrates exemplary components of the diagnostic tool of FIG. 1 according to an embodiment of the disclosure.

FIG. 2 illustrates exemplary components of the diagnostic tool 100 of FIG. 1. The components may include a microprocessor 202, a power supply/battery management 204, an optional internal battery 206, indicator 106, a memory 208, the vehicle connector 104, a wireless interface 210, and a connector interface 212. The components may communicate each other through a bus 214.

Microprocessor 202 may be any type of processor including having single, dual, quad, 8, 16, 32 core or any number of cores. The microprocessor 202 reads and processes data such as a program instruction stored in the memory 208 or vehicle data, such as diagnostic data from the vehicle ECU. Microprocessor 202 may be embodied by a microcontroller or may be a collection of electrical circuitry components built to interpret certain electrical signals and perform certain tasks in response to those signals. Additionally, the microprocessor 202 either internally therein or externally in communication therewith, associated RAM, ROM, EPROM, clocks, decoders, memory controllers, and/or interrupt controllers, etc. (all not shown) known to those in the art to be needed to implement a processor circuit. In other embodiment, microprocessor may be or include an integrated circuit, a field programmable gate array (FPGA), a complex programmable logic device (CPLD), a programmable logic array (PLA), an application specific integrated circuit (ASIC), or a combination thereof.

The microprocessor 202 includes all necessary transceivers or alternatively individual transmitter and receiver to communicate in various communication protocols including, but are not limited to: SAE J1850 (VPM), SAE J1850 (PWM), J1708, J1587, LIN (local interconnect network), VAN (vehicle area network), ISO 9141-2, ISO 14230-4 ("Keyword 2000"), OBD I and II and the like. The present disclosure is not intended to be limited to any specific communications protocol, or even to electrical communications protocols. Other present and future protocols that the diagnostic tool may communicate in, such as fiber optic, ISO 15765-4, MS CAN, and HS CAN are also within the scope of the disclosure.

The microprocessor 202 can include an authentication processor that communicates with the wireless interface 210. The authentication processor can be one of the cores of the microprocessor 202 or a separate microprocessor. The authentication processor using the wireless interface 210 communicates with a remote authentication server in order to authenticate a software or hardware. The authentication may be based on serial number, brand name or unique identification, username, login information, vehicle identification number, fingerprint of the technician, password, cornea of the technician, DNA of the technician and other unique characteristics.

In an alternative embodiment, the diagnostic tool 100 can include a display, such as a touch screen display, LED, OLED, VGA, and the like. The touch screen allows the technician to manipulate any of the screens, icons and the like discussed herein or show information to the technician. In this embodiment, the microprocessor 202 may communicate with the display on the diagnostic tool 100.

The memory 208 can include, for example, volatile, non-volatile, solid state, flash, magnetic, optical, permanent, removable, writable, rewriteable, or read-only memory. If the memory 208, is removable, examples may include a CD, DVD, or USB flash memory, which may be inserted into and removed from a CD and/or DVD reader/writer (not shown), or a USB, Fire-Wire, Serial, Parallel port (not shown).

The memory 208 may contain software to run the diagnostic tool 100, communicate with the ECU or process vehicle data retrieved from the ECU or perform other functions described herein. The vehicle data may include diagnostic trouble codes (DTCs) that are set in the ECUs. Memory 208 can store the necessary communication protocols used to communicate with a remote computing device such as a smart phone 200 or the ECU in the vehicle.

The power supply/battery management 204 can control power from various sources including an optional internal battery 206, USB connection, or the vehicle battery (not shown). By way of example, the internal battery 206 may be any type of battery including a Lithium ion battery or a Lithium polymer type battery, Lithium Air, Lithium vanadium oxide, although other types of batteries known to bile of ordinary skill in the art may also be used (e.g., Nickel-Cadmium or nickel metal hydride battery).

Internal battery 206 is chargeable at a rate of up to 1.5 A through connector interface 212, in accordance with "USB Battery Charging 1.2 Compliance plan" by USB Implementers Forum Inc., dated Oct. 12, 2011.

Indicator 106, as discussed above, can indicate to the technician the state of diagnostic tool 100. There can be more than one indicator and more than one color can be used to provide information regarding the diagnostic tool 100 to the technician. The vehicle connector 104 can be any type connector including an OBD I or II connector that couples to the data link connector in the vehicle.

The wireless interface 210 can include the appropriate transmitter, receiver, a transceiver or a combination thereof. The wireless interface 210 can be configured to communicate via RF (radio frequency), satellites, cellular signals (analog or digital), Bluetooth®, Wi-Fi, Infrared, ZigBee, near field communication, infrared, Local Area Networks (LAN), WLAN (Wireless Local Area Network), other wireless communication configurations and standards or a combination thereof. Wireless interface 210 allows the diagnostic tool 100 to communicate with a remote device such as the smart phone 200. In other embodiment, the wireless interface 210 may include global positioning system receiver and transmitter in order to determine the location of the diagnostic tool 100 and indirectly the location of the vehicle to which the diagnostic tool is attached thereto.

The connector interface 212 may be any type of connector that allows a connection to another device and allows bidirectional or unidirectional communication and/or power to the diagnostic tool and another device. The connector interface to 212 can be a serial port, parallel port, FireWire port, Ethernet port, a USB port, an infrared port, an RS 232 port, HDMI port or a port that is proprietary to the manufacturer of the diagnostic tool 100, or any other conventional communications port.

When the diagnostic tool 100 is connected to the vehicle through the vehicle connector 104, power can be provided by the vehicle's battery. There are typically two states that the diagnostic tool 100 may operate in. In one state, the diagnostic tool 100 is connected via a wireless connection 150 to a smart phone 200 and draws normal power from the vehicle battery. In a second state, the diagnostic tool 100 draws less or reduced power when disconnected from the smart phone 200. Because the Bluetooth connection is broken or because no communication has occurred with the smart phone 200 for a predetermined period time then the diagnostic tool 100 enters the second state and draws less power. By being able to operate in a lower power state, the vehicle battery is not drawn down to a state that it needs to be recharged. Thus, the power supply/battery management 204 can control the diagnostic tool 100 to power down when not in use or power up when in use.

In one embodiment, if there has not been any communication with the smart phone for a predetermined amount of time, such as 10 minutes or so, then the diagnostic tool 100 can power down to the lower power state. Other predetermined times may include 5, 7, 12, 15, 20 minutes or other time periods as desired by the technician. In this embodiment, if the diagnostic tool 100 receives a command from the smart phone 200 within the predetermined amount of time, the timer will be reset. If no such command is received, then the diagnostic tool 100 enters the lower power state and terminates any Bluetooth connection. Examples of a command include a power status ping, view data, or read codes. The diagnostic tool 100 can also sends a message to the smart phone confirming that the technician would like the diagnostic tool to enter the lower power state. If no response is received by the diagnostic tool 100 within a predetermined period time, such as 30 seconds, 1 minute, 3 minutes or 5 minutes and the like, then the diagnostic tool 100 enters the lower power state. This way, the technician can avoid any inadvertent disconnection of the Bluetooth connection with the diagnostic tool 100.

In another embodiment, the smart phone 200 also includes software that can assist in powering down the diagnostic tool 100 to the lower power state. Smart phone 200 can have a 30 second timer that request power status ping from the diagnostic tool 100. Alternatively, the software discussed below may be on the diagnostic tool itself and the method 300 can be adapted accordingly with certain modifications, additions and removal of some of the steps.

Figure 3:
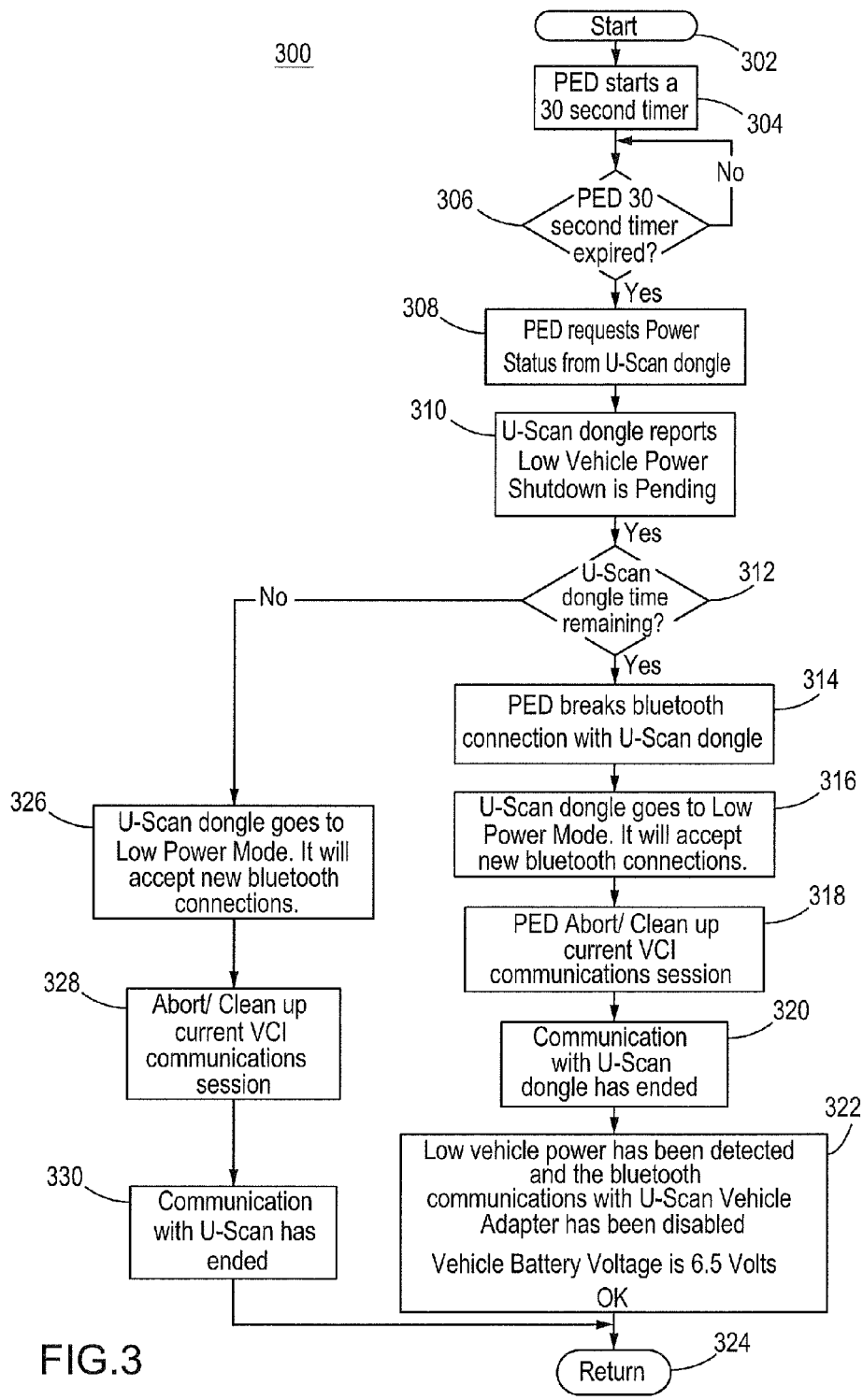
FIG. 3 illustrates power management method according to an embodiment of the disclosure.

FIG. 3 illustrates power management method 300 according to an embodiment of the disclosure. The method starts at step 302. At step 304 the smart phone 200 starts a 30 second or so timer and proceeds to step 306, where a determination is made if the 30 seconds timer has expired. If the timer has not expired or no, then the process loops at step 306 until the timer has expired and then proceeds to step 308. In other embodiments, the timer may be any amount of time including 20 seconds, 25 seconds, 45 seconds, 1 min. and the like. At step 308, the smart phone 200 sends a power status ping to the diagnostic tool 100 to which the tool 100 responds by sending vehicle battery voltage back to the smart phone display 201 to the technician. At step 310, as part of the response, if the diagnostic tool 100 detects that the vehicle battery voltage is below a predetermined level such as 10.5 V (FIG. 4), then the diagnostic tool 100 starts a two-minute timer. Other amount of time such as 1 min., 5 min. and the like may be used. Also at step 310, the diagnostic tool 100 returns a "vehicle battery low" message along with a current battery voltage, and the remaining time on the two-minute timer (See FIG. 4). At step 312, a determination is made regarding whether there is any remaining time on the two-minute timer. If yes, at step 314, the smart phone 200 breaks the Bluetooth connection with the diagnostic tool 100. At step 316, due to break in the Bluetooth section, the diagnostic tool enters the lower power state. Additionally, at step 316, the diagnostic tool 100 can accept new Bluetooth connection. At step 318, a smart phone 200 and/or the diagnostic tool 100 can clean up the current communication session. At step 320 the communication with the diagnostic tool has ended and the smart phone can display a message that the communication with the diagnostic tool 100 has ended at step 322. The message may also include current battery voltage. The method ends at step 324.

If at step 312, the determination is no, and the smart phone 200 did not break the Bluetooth connection 150, then at step 326, the diagnostic tool 100 enters the lower power state thereby breaking the Bluetooth connection 150. At step 328, the smart phone 200 and/or the diagnostic tool 100 detects that the Bluetooth connection 150 is broken and cleans up the current communication session. At step 330, a message is displayed to the technician on the smart phone 200 indicating that communication session has ended. At step 324 the method ends.

As stated above, when the two-minute timer ends, the diagnostic tool 100 enters the lower power state and terminates any Bluetooth connection 150. The method described above helps to prevent unnecessary power drain a vehicle battery and the smart phone battery. In the lower power state, the diagnostic tool 100 draws less power and is able to maintain information stored in RAM. Additionally, in another embodiment, the diagnostic tool 100 is capable of starting the two-minute timer on its own (no power status ping) when it detects that the battery voltage is below a predetermined level. In still another embodiment, the smart phone 200 can send a signal to the diagnostic tool 100 to enter the lower power state without being prompted.

In other embodiments, the software on the smart phone 200 may ping the diagnostic tool to keep it active during long diagnostic test so that the tool does not enter the lower power state and break Bluetooth connection 150. For example, the technician may be running the long diagnostic test and during the test visits his Facebook page or other websites, which may cause the diagnostic tool to think that it should enter the lower power state due to inactivity. By knowing that the diagnostic test will run longer than normal, the smart phone software can continue to ping the diagnostic tool 100 in order to keep it from entering the lower power state. Alternatively, the technician may want to keep the Bluetooth connection even though he is not currently using the software, a timer such as 5 minutes may be used to keep the connection alive using pings. Once the 5 minutes is up, and software is not being used (or is back grounded) to communicate with the diagnostic tool 100, then the tool can enter a lower power state. This alternative embodiment allows the technician to keep the Bluetooth connection alive in the event that he changes his mind and wants to return to diagnosing the vehicle to which the diagnostic tool 100 is attached.

Figure 4:
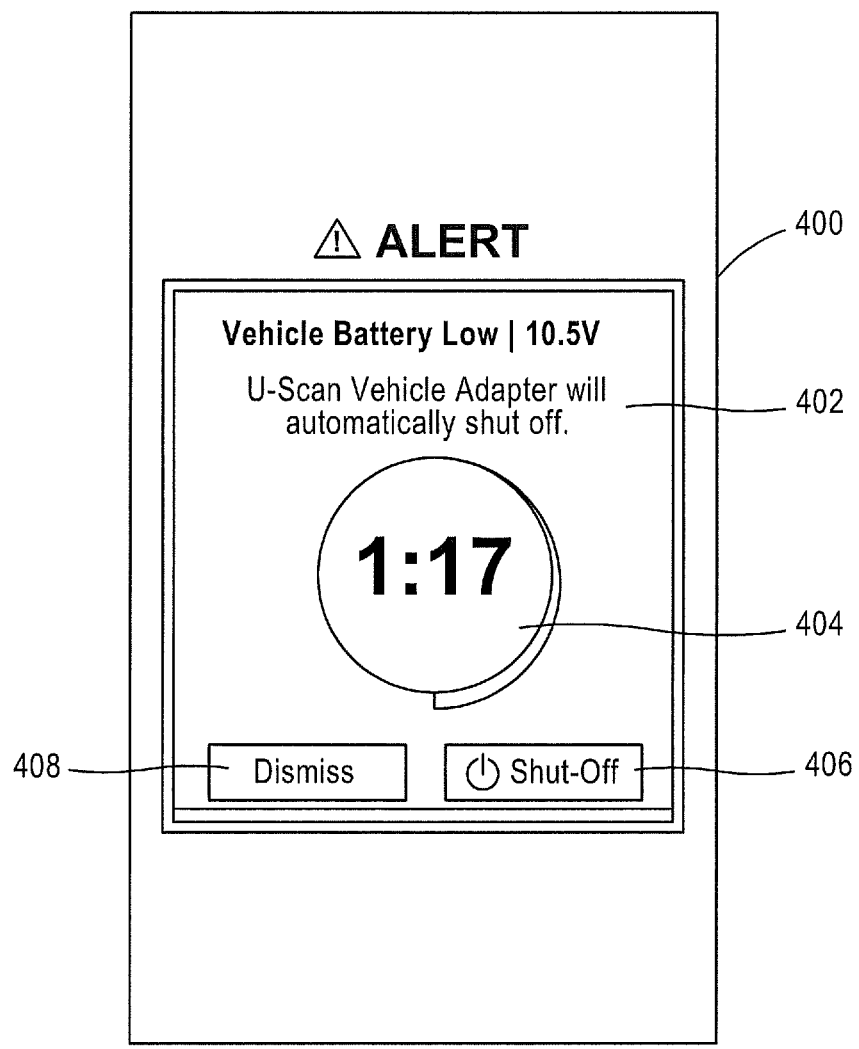
FIG. 4 illustrates a screen that may be displayed during a step the method of FIG. 3 according to an embodiment of the disclosure.

FIG. 4 illustrates a screen 400 that may be displayed during a step of method 300 of FIG. 3 according to an embodiment of the disclosure. Screen 400, which may be on the smart phone 200, can include text message 402 that provides information to the user such as the diagnostic tool 100 is entering the lower power state or is shutting down. The text message 402 can also include an "Alert" icon. In another embodiment, the smart phone 200 may vibrate or emit a sound to alert the technician of the text message 402. A timer counter 404 may be displayed on screen 400 and shows the remaining time for the diagnostic tool 100 before it enters the lower power state or off. Selection box 406 when selected by the user can make the diagnostic tool enter the lower power state or shutdowns regardless of the remaining time on timer counter 404. Selection box 408 when selected can dismiss the message from the screen 400.

Figure 5:
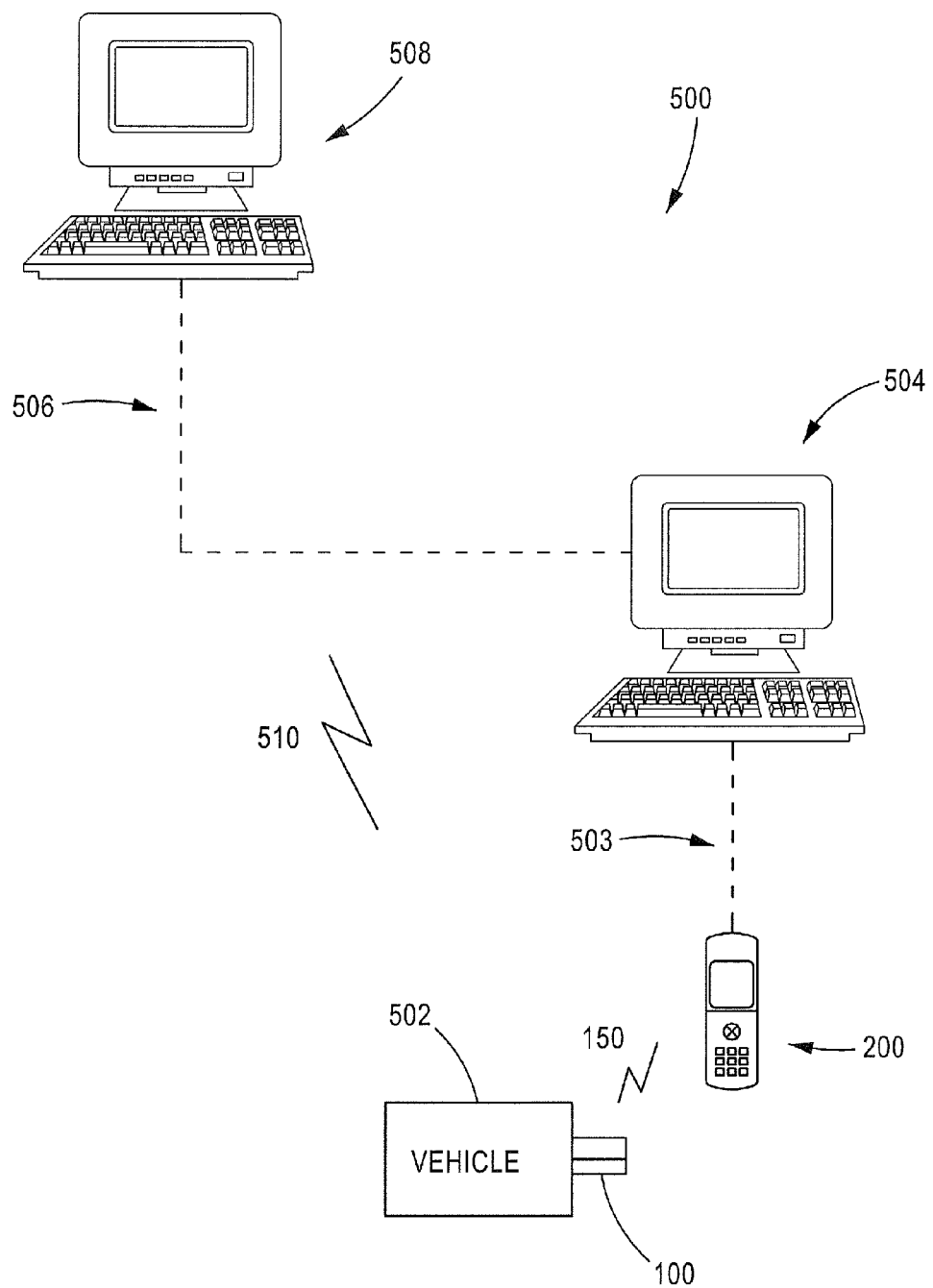
FIG. 5 illustrates a crediting system according to an embodiment of the disclosure.

FIG. 5 illustrates a crediting system 500 according to embodiment of the disclosure. The crediting system 500 includes a vehicle 502 that is coupled to the diagnostic tool 100, which in turn communicates with the smart phone 200. Smart phone 200 in turn communicates with authentication server 504, which can also communicate with another server 508.

Before first use, the technician can register the diagnostic tool 100 at the authentication server 504. In one embodiment, diagnostic tool 100 can communicate with authentication server 504 directly via a wireless connection 150. In another embodiment, the diagnostic tool 100 can communicate with the smart phone 200 via wireless connection 150, and the smart phone 200 may communicate with authentication server 504 via a communication line 503, which may be a wired or wireless connection. The diagnostic tool 100 can include certain unique identifier such as a configuration file, serial number, brand identifier, Mac address, user ID, dealer identifier, garage identifier, region of use identifier, technician identifier and the like. Any type of identifier can be used so long as it can help identify the product, which in this case may be the diagnostic tool 100. The unique identifier can be used (as explained below) to credit a percentage of the purchase of the software to a third party, such as the dealer who sold the diagnostic tool 100. The percentage can be any percentage including 1% to 75% or can be more, such as 80% or less, such as 5%. The unique identifier can be previously assigned so that proper credit for the purchase of the software that is used with the diagnostic tool 100 can be credited to the correct third party. For example, the third party may be AutoZone, Amazon, AAA, Pep Boys and the like, where the diagnostic tool 100 was originally purchased. AutoZone or the manufacture of the diagnostic tool 100 can assign the unique identifiers to the diagnostic tool 100, technicians, garages or repair shops, and the like so that software purchased for use with the diagnostic tool 100 can be credited to AutoZone in addition to being credited to manufacture of the tool and/or software.

During use, the diagnostic tool 100 retrieves diagnostic information such as DTCs (FIG. 6) from the vehicle and transmits it to smart phone 200. The diagnostic tool 100 can process the diagnostic data or information and send (e.g. via wireless connection 150) the processed information to the smart phone display 201 or simply can act as a pass-through device for the diagnostic data with little or no reformatting or processing. At the smart phone 200, the technician can purchase relevant software packages or modules (further shown in FIG. 6) in order to diagnose the retrieved diagnostic data, such as DTCs. The smart phone 200 may communicate with an authentication server 504, which can provide a license and or authenticate the purchase of the diagnostic software. The authentication server 504 may be owned by the dealer, manufacture, or other parties, such as Apple (ITunes), Amazon (Android Store) or Google (Google Play) and the like. The diagnostic software may be downloaded or previously downloaded as a full package (all diagnostic modules including all vehicles, manufactures, or systems) to the smart phone 200. Then when the technician is ready to purchase a certain diagnostic module, such as code definitions, the smart phone 200 (or the diagnostic tool 100 via wireless connection 150) can communicate with the authentication server 504 via a communication line 503 and purchase the desired diagnostic module or modules. The authentication server 504 can return a signal via the communication line 503 (or wireless connection 150 to the diagnostic tool) to unlock that portion of the diagnostic software that contains the purchased diagnostic module or modules, thereby, allowing the technician to interpret the code definition for the retrieved DTCs.

Simultaneously or shortly thereafter, authentication server 504 can send a credit (percentage of the purchase price) to server 508 via a wireless connection 506 for the purchased software for use on the diagnostic tool 100. Alternatively, the smart phone 200 or diagnostic tool 100 can perform the crediting function described herein. The server 508 may be the back end server of the manufacturer of the diagnostic tool and can receive purchasing information from the authentication server 504. After confirming the purchase, server 508 may send the credit (previously programmed) to another server (not shown) that belongs to the third party or dealer. Alternatively, the server 508 may be a bank server, which is able to credit the dealer or third-party account's that is serviced by that bank. In still another embodiment, the server 508 may be owned by a third party escrow agent who then provides the dealer or another third party the credit as agreed to.

The garage may have various branded diagnostic tool 100, such as AAA or AutoZone that are tied to one particular account, such as iTunes or Google Play. In one embodiment, the dealer or the dealer store that sold the diagnostic tool 100 to which the software is being unlocked will get credit based on the unique identifier associated with the tool.

Figure 6:
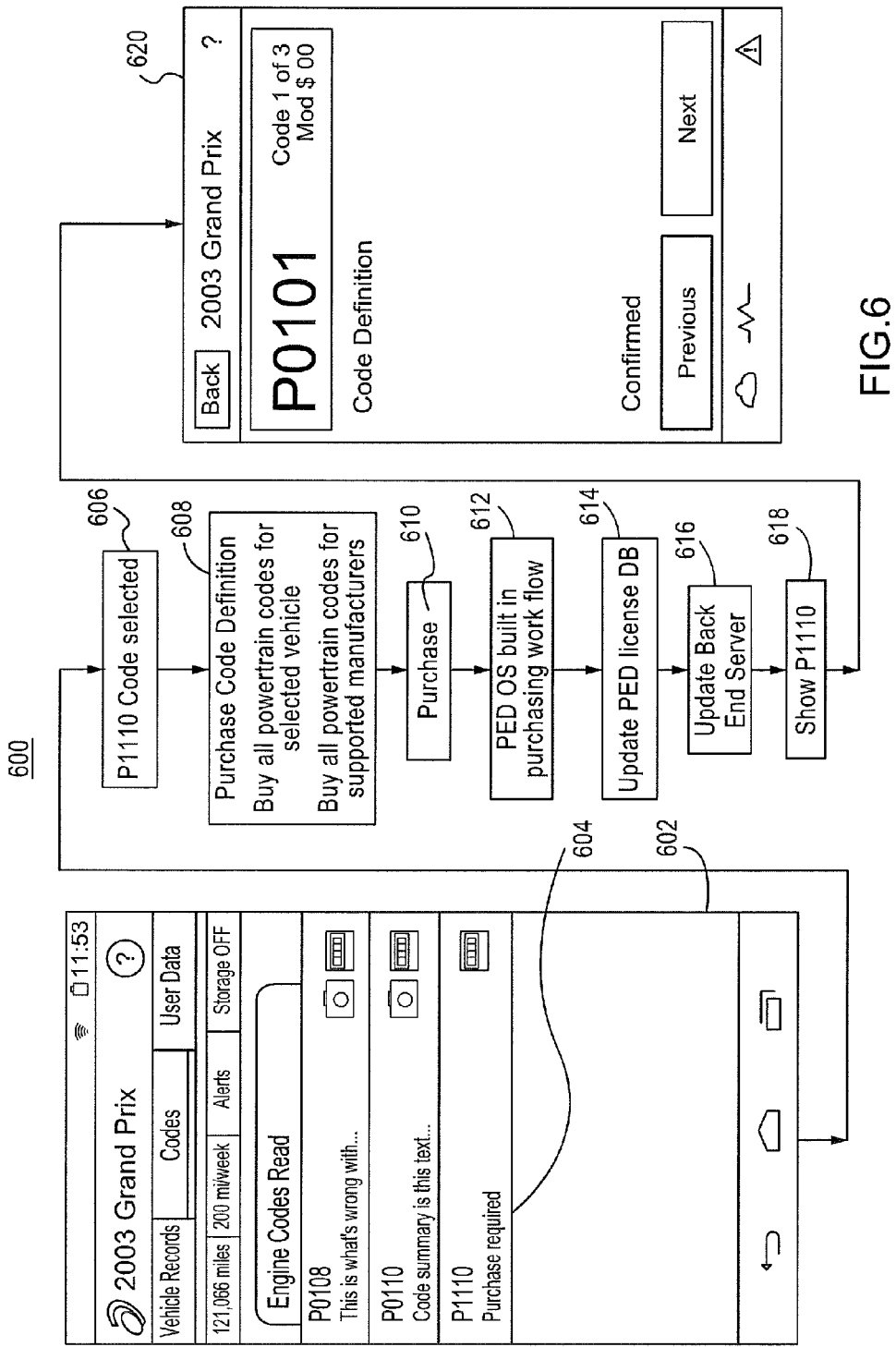
FIG. 6 illustrates a crediting system method according to an embodiment of the disclosure.

FIG. 6 illustrates a crediting system method 600 according to an embodiment of the disclosure. Screen 602 of the smart phone 200 displays the retrieved DTCs (P0108, P0110, P1110) 604 from the vehicle under test. The smart phone 200 with the software can determine that it does not have a proper software module activated or authenticated in order to interpret the retrieved DTCs or a particular DTC. The determination can be made when the technician taps a portion of the screen 602 that contains for example, the DTC P1110 shown as step 606. A new screen 602 can display the purchasing options 608 to the user such as purchase a single definition, purchase all powertrain codes for the previously selected vehicle or purchase all powertrain codes for supported manufacturers and the like. At step 610, the technician can purchase the selected option by selecting that option on screen 602. At step 612, the smart phone 200 can use its purchasing workflow and contact authentication server 504. At step 614, a database contained in the software on the smart phone 200 can be updated with the license for the purchased option and proceed to unlock the purchased option or module for the diagnostic software (entire diagnostic software) previously downloaded to smart phone. This allows the technician to interpret the retrieved DTCs from the vehicle as shown in step 618 and on screen 620. After reviewing the particular DTC, such as the P0101 or P1110, the user can select an icon from the screen 602 to view the next DTC with definition or a previous DTC with definition or select done.

In another embodiment, the diagnostic tool 100 and/or the smart phone 200, respectively, can retain in its memory an activity log. The activity log contains vehicle data that was retrieved from various vehicles over a period of time. In the event, the technician did not have a particular software module to interpret the retrieved vehicle data and subsequently purchases the appropriate software module, then the purchased software module can be used to diagnose the previously logged but not interpreted vehicle data. This allows for the technician to view data from a previous scan in order to assist in the current diagnosis of that same vehicle. That is, a code that may have been set in the ECU but not interpreted and only occurs intermittently may be used to confirm the current diagnosis.

As shown in FIG. 5, the diagnostic tool 100 is connected to the vehicle 502 and is also in communication with the smart phone 200. At this point, software on the smart phone has been activated by the technician, which then causes the diagnostic tool 100 to query the vehicle to which it is attached. This may refer to as AutoID, which is further discussed below in FIG. 8. If the diagnostic tool 100 remains connected to the vehicle since the last time it communicated with a smart phone 200, then it will transmit to the smart phone 200 the ID of the vehicle, which may be stored in its RAM memory. This allows the technician to continue to diagnose the vehicle where he left off.

Figure 7:
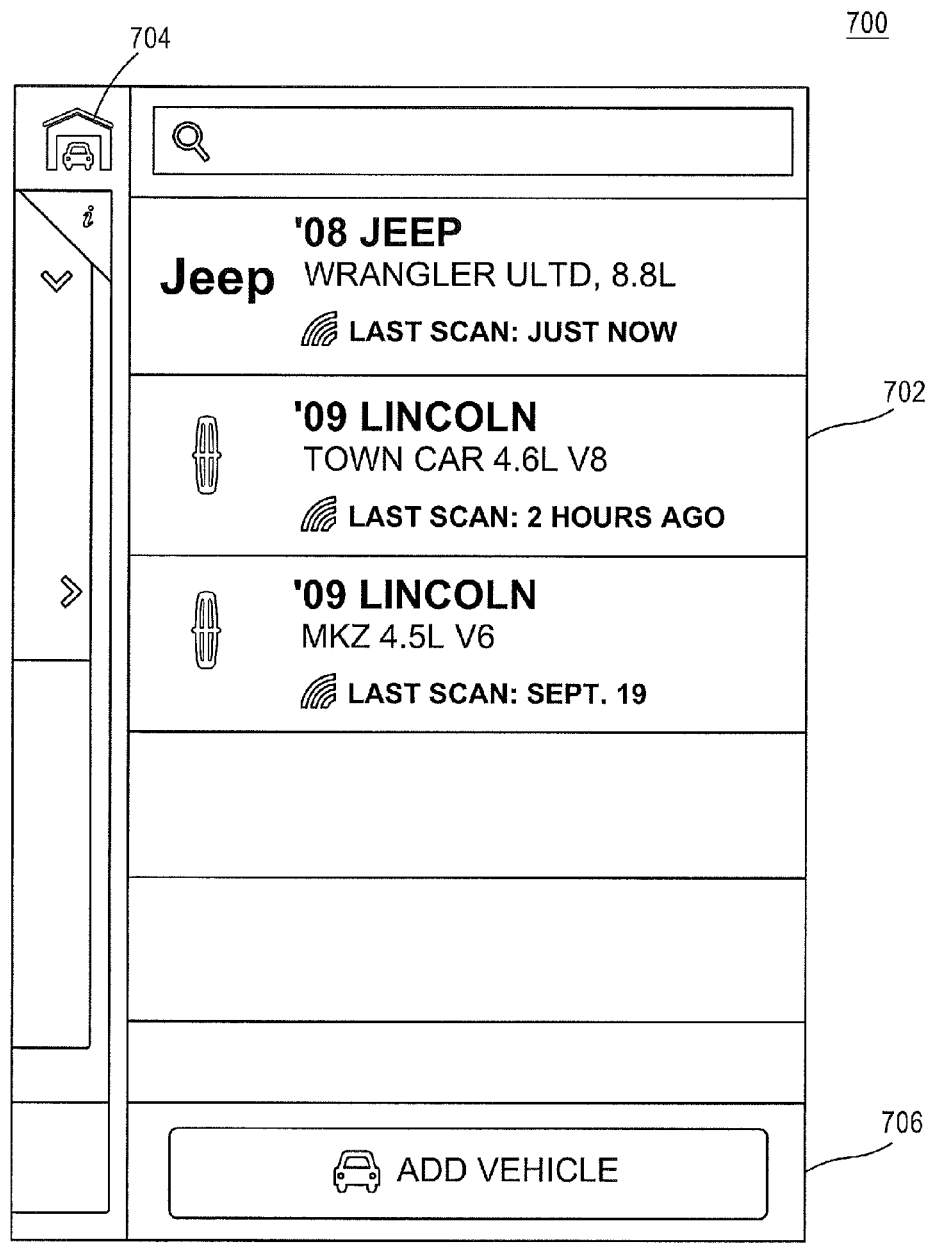
FIG. 7 illustrates a "garage" screen that may be displayed on a smart phone according to an embodiment of the disclosure.

FIG. 7 illustrates a "garage" screen 700 that may be displayed on a smart phone 200. When the technician touches the "garage" icon 704, the screen 700 can display a list of vehicles 702 including their make, model, year and engine type. The vehicles 702 information can also include the last time that the vehicle was scanned and/or diagnosed. The time of the last scan being just now, 2 hours ago, 2 days ago, a week ago, a month ago, 6 months ago, a year ago and the like. The last scanned vehicle may appear on top of the list of vehicles 702 so that the technician can quickly return to a vehicle that is likely still in the shop rather than other vehicles, which based on the last scan time, may have returned to the owner or repaired. Additionally, screen 700 includes selection button 706 to allow the technician to manually add a vehicle (as discussed herein) or forces the diagnostic tool 100 to reattempt to identify (as discussed herein) the vehicle to which it is connected to.

In order to manually add a vehicle to the "garage," the technician may be presented with a series of menu options that may include manufacture or make, model, year and engine type. However, the technician may prefer to AutoID the vehicle by the diagnostic tool and/or smart phone as discussed herein.

Figure 8:
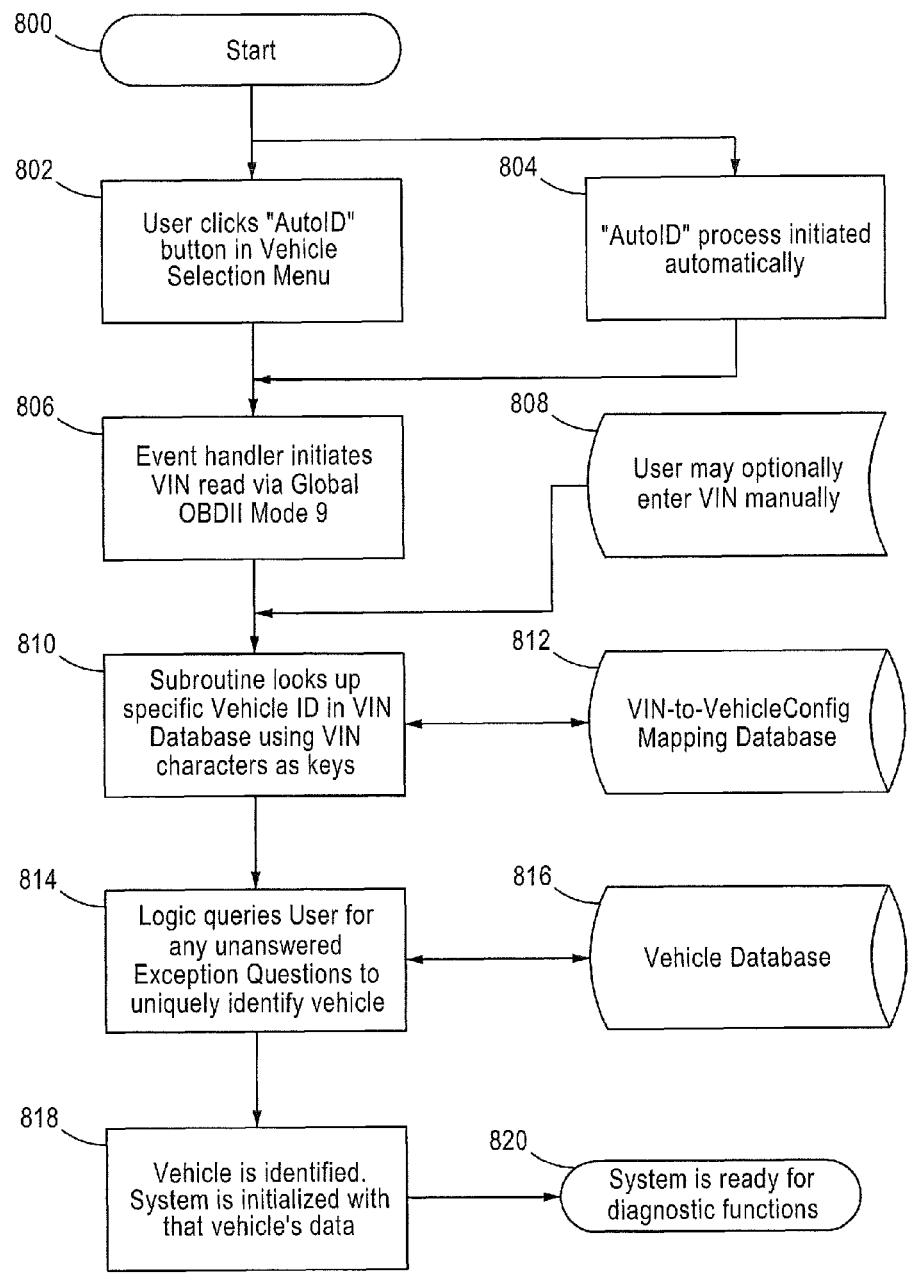
FIG. 8 is a flow chart of a process for automating the selection of the vehicle being serviced by a technician according to an embodiment of the disclosure.

FIG. 8 is a flow chart of a process for automating the selection of the vehicle being serviced by a technician. The AutoID process discussed may be done by the smart phone 200 and/or the combination of the smart phone 200 and the diagnostic tool 100. It is noted that the selection of the vehicle includes selection of such information as the make, model and year of the vehicle as well as vehicle specific equipment such as engine type, transmission type, airbags, anti-lock brakes, etc. After the diagnostic tool 100 is connected to the vehicle, the process may start at step 800, and if so configured, the device will automatically start the vehicle identification process (AutoID process) at step 804. Alternatively, the AutoID process may be started upon the occurrence of some predetermined event such as, for example, connecting the diagnostic tool to the OBDII connector in the vehicle. If the tool is not configured to launch the AutoID process automatically on the occurrence of some event, such as turning on the tool or connecting the tool to the OBDII connector, the user may manually initiate the AutoID process at step 802 by scrolling to the AutoID process option in a vehicle selection menu using the selection button on a screen of the smart phone 200.

Whether automatically initiated at step 804 or selected by the user at step 802 (via the smart phone, for example), the first step of the AutoID process 806 is for the event handler of the diagnostic tool 100 to initiate a read of the vehicle identification number (YIN) as stored on the ECU. This reading of the VIN number can be accomplished, for example, using the global OBDII mode 9 functionalities. Alternatively, for vehicles that do not include the global OBDII mode 9 functionality, the user may enter the VIN number manually 808 (via the smart phone, for example). In still another embodiment, the vehicle can be identified by a manufacturer specific command requested by the smart phone 200 or the diagnostic tool 100.

Following the entry of the VIN number, either automatically at step 804 or manually at step 808, at step 810 a subroutine of the AutoID process looks up the vehicle in a VIN to vehicle configuration mapping database 812. In addition to the VIN number, information that can be obtained by this subroutine 810 using the global OBDII mode 9 functionalities includes calibration identification information as well as vehicle in-use performance information. Examples of such information include engine type, transmission type, engine tuning specification, etc. It should be readily understood by those skilled in the art that databases, such as the VIN to vehicle configuration mapping database 812, can be accessed by the diagnostic tool 100 over the Internet through a wired connection or the wireless interface.

It may not be possible to determine the full set of required vehicle selection information from the information acquired by the subroutine at step 810 of the AutoID process and thus, it may be necessary for the user to manually input (via the smart phone, for example) additional information at step 814. Alternatively, additional automated searching of the system for vehicle identification information may also be performed as part of the AutoID process. The manual entry of additional information at step 814 or alternative additional automated searching may be facilitated by referral of the system to internal or external vehicle database 816.

Once the vehicle is identified, the diagnostic tool 100 is initialized with appropriate data for that vehicle at step 818. The diagnostic tool is then ready to perform diagnostic testing of the vehicle to which it is linked at step 820. It should be readily recognized that the various steps of the process of FIG. 8 may be repeated as appropriate in order to automate as much of the vehicle selection process as practicable. Thus, if it becomes necessary for a user to enter some portion of the vehicle selection data manually, the AutoID process may refer to the vehicle database 816 after the manual entry of one or more individual pieces of vehicle identification data by the user to determine if any or all remaining data can be automatically populated.

In the event that an incorrect controller is installed in a vehicle, the vehicle may not be properly identified. To the extent such a condition is identified by the AutoID process, the user will be notified by means of an appropriate warning message on the display 201 of the smart phone 200. Where this occurs, or where the user determines that the vehicle automatically identified by the AutoID process is incorrect, the user may override the AutoID process and manually enter the vehicle identification information or exit the process.

The diagnostic tool 100 can be configured additionally or alternatively to look up on-tool and/or off-tool repair assets to provide service and repair information to a user automatically once one or more diagnostic trouble codes (DTCs) are read by the diagnostic tool 100 and/or fault symptoms are entered into the diagnostic tool 100. For purposes of this disclosure this functionality will be referred to generally as automated fix detection. Examples of on-tool repair assets would include repair procedures provided by the original equipment manufacturers and experience based repair information downloaded and stored to the diagnostic tool 100. Examples of off-tool repair assets include such assets as IATN and Direct-Hit™. Additional disclosure regarding auto fix detection can be found in an application entitled "SYSTEM AND METHOD FOR AUTOMATED VEHICLE SELECTION AND AUTOMATED FIX DETECTION," having U.S. patent application Ser. No. 13/606,850, filed on Sep. 7, 2012, the disclosure is hereby incorporated in its entirety.

In another embodiment, in the event that AutoID process is unable to ultimately identify the vehicle, the diagnostic tool 100 can initiate a "fingerprinting" process. This process includes the diagnostic tool 100 retrieving as much vehicle data as possible in order to uniquely "fingerprint" the vehicle. The vehicle data or "fingerprint" markers can include PID (parameter JD) mode 1, 5 and/or 9, for example, or nonstandard PIDs and UM monitors specific to the vehicle, partially retrieved VIN, engine type, vehicle communication protocols, types ECUs, DTCs that are set, and the like. By retrieving as much of these "fingerprint" markers as possible, it may be possible that the combinations of the markers can create unique "fingerprint" for the vehicle so that when the diagnostic tool 100 is connected to the vehicle (and is unable to AutoID it) is able to search its database that contains previously scanned or diagnosed vehicles in order to bring up that vehicle's records including the scanned or diagnosed records.

Once identified through the AutoID or the "fingerprinting" process, the technician can assign a particular nickname to the vehicle. Both the nickname can be stored as part of a database on the diagnostic tool 100 and/or the smart phone 200. Through use of the AutoID or the "fingerprinting" process, vehicles can be added to the "garage" so that the technician can quickly start to diagnose the vehicle.

Although AutoID and "fingerprinting" are discussed, once the diagnostic tool 100 is attached to the data link connector in the vehicle, the tool 100 can identify the vehicle automatically and launches start screen 900 (discussed below). For example, if the diagnostic tool 100 is still coupled to the vehicle or was recently coupled to the vehicle (and have not coupled to another vehicle), the vehicle identification information may still be present in the RAM of the tool 100 and thus, the vehicle identification information can initiate the software on the smart phone 200 and launch the start screen 900. Thus, the smart phone's software can start diagnosing the vehicle as soon as the diagnostic tool 100 is coupled to the vehicle or as soon as the technician initiates the smart phone's software.

Figure 9:
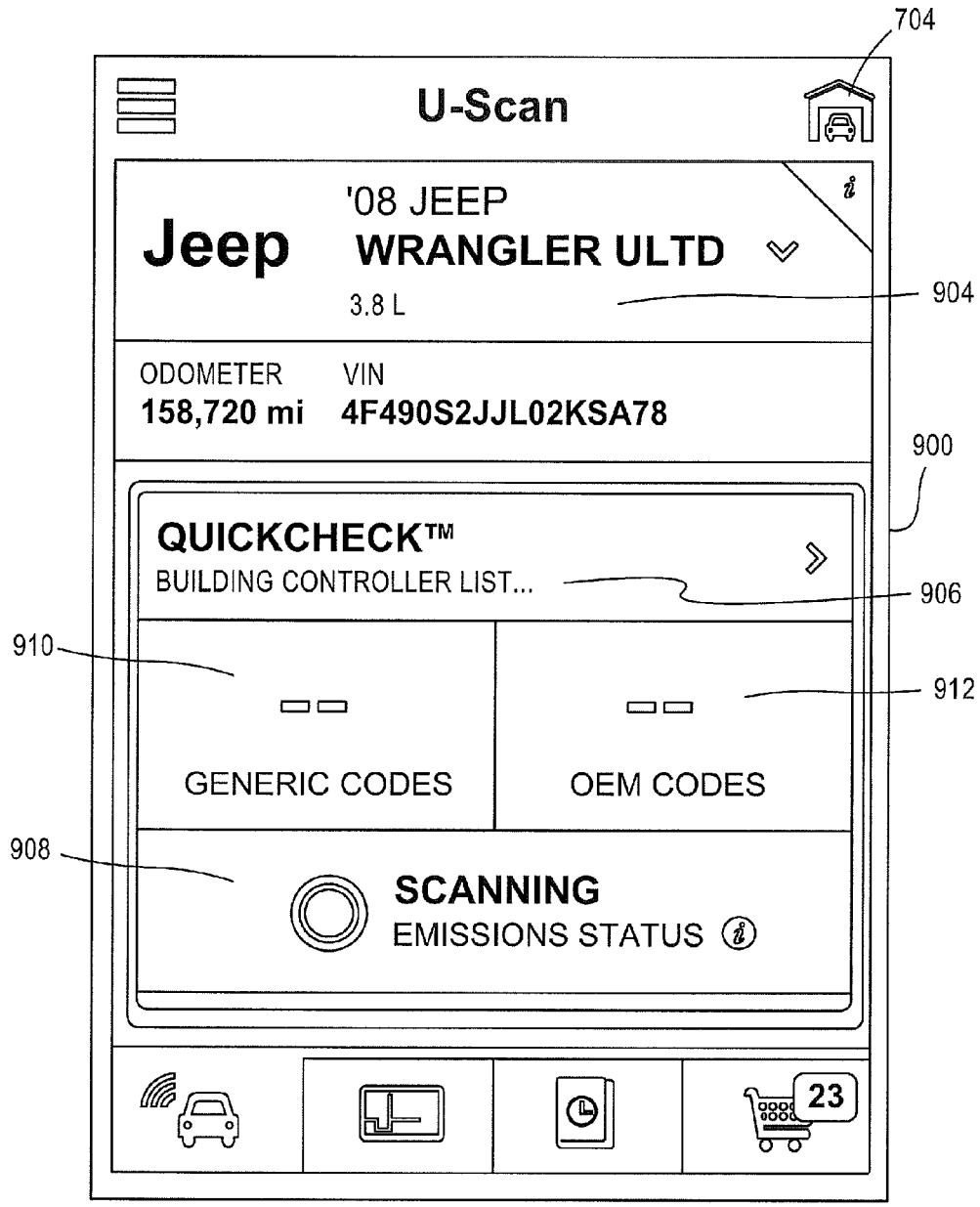
FIG. 9 illustrates a start screen according to an embodiment of the disclosure.

FIG. 9 illustrates a start screen 900 according to an embodiment of the disclosure. The start screen 900 includes various components including icons, text boxes and selection boxes. Garage icon 704 can appear on the start screen 900 and when pressed or tapped can bring up to "garage" screen 700. Start screen 900 illustrates information about the vehicle under test on a text box 904. In this embodiment, text box 904 provides information that the vehicle under test is a 2008 Jeep Wrangler ULTD with a 3.8 L engine, an odometer reading of about 158,000 miles and having VIN number 4F490S2JJL02KSA58. The text box may include other information such as the color or a picture of the vehicle, the name or picture of the owner of the vehicle, last time scanned or diagnosed, contact information (email, cell phone, etc.) of the owner, owner preferences and the like. A quick check icon 906 when pressed can initiate a quick check or scan of the vehicle by the diagnostic tool 100. If any generic codes or OEM (original equipment manufacturer) codes are found in the ECUs, they may be displayed in text box 910, 912, respectively. Status box 908 illustrated a status of the scanning during the quick check.

Although the embodiments herein are described the use with a diagnostic tool or smart phone, they may also be used in any computing device such as a tablet, a PC, notebook, PDA, and the like.

The many features and advantages of the disclosure are apparent from the detailed specification, and thus, it is intended by the appended claims to cover all such features and advantages of the disclosure, which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A diagnostic tool, comprising:
a processor that controls a function of the diagnostic tool;
a memory that stores software that diagnose an issue of a vehicle and to operate the function of the diagnostic tool;
a power manager that switches the diagnostic tool from a normal power state to a lower power state and vice versa;
a vehicle connector interface that connects the diagnostic tool to a data link connector in the vehicle; and
a wireless interface that communicates with a remote device, wherein when a command from the remote device is received by the wireless interface within a first predetermined period of time, the diagnostic tool will remain in the normal power state.

2. The diagnostic tool of claim 1, wherein when the command is not received within the first predetermined period of time, then the diagnostic tool will switch from the normal power state to the lower power state.

3. The diagnostic tool of claim 1, wherein the diagnostic tool is powered by an internal battery or by a vehicle's battery.

4. The diagnostic tool of claim 1, wherein the command includes a power status ping, view data, or read codes.

5. The diagnostic tool of claim 1, wherein the first predetermined amount of time is 5 minutes, 7 minutes, 10 minutes, 12 minutes, 15 minutes, or 20 minutes.

6. The diagnostic tool of claim 1, wherein when the command is not received within the first predetermined period of time by the wireless interface, then a confirmatory message is sent to the remote device to confirm that the diagnostic tool should enter the lower power state.

7. The diagnostic tool of claim 6, wherein if a response from the remote device is not received by a second predetermine period of time, then the diagnostic tool enters the lower power state.

8. The diagnostic tool of claim 1, wherein in the lower power state, the diagnostic tool breaks a communication with the remote device.

9. The diagnostic tool of claim 1, wherein the remote device is a smart phone.

10. The diagnostic tool of claim 1, wherein when the wireless interface is in communication with the remote device, the diagnostic tool remains in the normal power state.

11. A method of power management in a diagnostic tool, comprising the steps of:
establishing a communication session between the diagnostic tool and a smart phone;
receiving, at the diagnostic tool, a power status request from the smart phone;
sending battery voltage information from the diagnostic tool to the smart phone in response to the request;
starting a timer for a predetermined period of time if the battery voltage is below a predetermined amount;
sending, from the diagnostic tool to the smart phone, a message that the connection between the diagnostic tool and the smart phone is terminating and a remaining amount of time remaining on the timer; and
powering the diagnostic tool from a normal power state to a lower power state.

12. The method of claim 11 further comprising the steps of:
accepting an additional communication session during the powering step; and
cleaning up the communication session between the diagnostic tool and the smart phone.

13. A vehicle diagnostic tool, comprising:
a processor that controls a plurality of functions of the vehicle diagnostic tool;
a memory that stores vehicle diagnostic software and software to operate the plurality of functions of the vehicle diagnostic tool;
an indicator that indicates a status of the vehicle diagnostic tool;
a power management device that switches the vehicle diagnostic tool from a normal power state to a lower power state and vice versa;
a vehicle connector interface that connects the vehicle diagnostic tool to a data link connector in the vehicle;
a wireless interface that communicates with a smart phone; and
a housing the houses the processor, the memory, the indicator, the power management device, the vehicle connector interface, and the wireless interface, wherein when a command is not received from the smart phone by the wireless interface within a first predetermined period of time, the vehicle diagnostic tool will switch from the normal power state to the lower power state.

14. The vehicle diagnostic tool of claim 13, wherein the status is a power status of the vehicle diagnostic tool.

15. The vehicle diagnostic tool of claim 13, wherein when the command is received within the first predetermined period of time, then the diagnostic tool remains in the normal power state.

16. The vehicle diagnostic tool of claim 13, wherein the vehicle diagnostic tool is powered by an internal battery or by a vehicle's battery.

17. The diagnostic tool of claim 13, wherein the command includes a power status ping, view data, or read codes.

18. The vehicle diagnostic tool of claim 13, wherein the first predetermined amount of time is 5 minutes, 7 minutes, 10 minutes, 12 minutes, 15 minutes, or 20 minutes.

19. The diagnostic tool of claim 13, wherein when the command is not received within the first predetermined period of time by the wireless interface, then a confirmatory message is sent to the smart phone to confirm that the diagnostic tool should enter the lower power state.

20. The vehicle diagnostic tool of claim 13, wherein if a response from the smart phone is not received by a second predetermine period of time, then the vehicle diagnostic tool enters the lower power state.

* * * * *